(12) United States Patent
Meza et al.

(10) Patent No.: US 8,607,844 B2
(45) Date of Patent: Dec. 17, 2013

(54) STRUCTURE FOR ASSEMBLING AND DISASSEMBLING PARTITION MEMBERS

(75) Inventors: Sergio Meza, Lyons, IL (US); Matthew Johnson, Chicago, IL (US); Mark Douglas Wynne, Bedford Park, IL (US)

(73) Assignee: L & P Property Management Company, South Gate, CA (US)

( * ) Notice: Subject to any disclaimer, the term of this patent is extended or adjusted under 35 U.S.C. 154(b) by 0 days.

(21) Appl. No.: 13/212,547

(22) Filed: Aug. 18, 2011

(65) Prior Publication Data
US 2012/0285636 A1 Nov. 15, 2012

Related U.S. Application Data

(60) Provisional application No. 61/485,877, filed on May 13, 2011.

(51) Int. Cl.
*A47H 13/00* (2006.01)
(52) U.S. Cl.
USPC .......................................... 160/368.1; 52/578
(58) Field of Classification Search
USPC ................... 160/351, 369; 49/197; 52/238.1; 256/24, 65.11, 65.12, 65.13
See application file for complete search history.

(56) References Cited

U.S. PATENT DOCUMENTS

| | | | | | |
|---|---|---|---|---|---|
| 4,356,667 | A | * | 11/1982 | Malachowski | 49/454 |
| 5,014,466 | A | * | 5/1991 | Winner | 49/504 |
| 5,364,076 | A | * | 11/1994 | Nicholls | 256/22 |
| 5,372,354 | A | * | 12/1994 | Cacicedo | 256/22 |
| 7,461,489 | B2 | * | 12/2008 | Herbertsson | 52/578 |
| 7,857,291 | B2 | * | 12/2010 | Dombroski | 256/24 |
| 2006/0273294 | A1 | * | 12/2006 | Dombroski | 256/24 |

FOREIGN PATENT DOCUMENTS

NL 1002257 8/1997

* cited by examiner

*Primary Examiner* — Katherine Mitchell
*Assistant Examiner* — Johnnie A Shablack
(74) *Attorney, Agent, or Firm* — Shook, Hardy & Bacon L.L.P.

(57) ABSTRACT

A screening for separating a protected area from a more accessible area includes a plurality of vertical supports with panels retained between the supports. The upper or lower ends of the panel are retained on pivot pins while the end of the panel opposite the pivot pins is removably locked to the support. The locking structure includes a latch that can be released from a position outside the enclosure and a lock that is lockable and unlockable from inside the enclosure. When the lock is actuated, the latch cannot be unlatched until the lock is subsequently unlocked.

19 Claims, 13 Drawing Sheets

STRUCTURE FOR ASSEMBLING AND DISASSEMBLING PARTITION MEMBERS

The applicants claim priority from their provisional patent application filed May 13, 2011 and assigned Ser. No. 61/485,877. The present invention relates to assembling and locking together partition elements for isolating protected areas, including lockable members that can be unlocked to permit repair or replacement of the partition elements.

BACKGROUND OF THE INVENTION

Industrial sites, such as factories and the like, may have a large portion of the floor area that contains equipment that presents a danger to unwary bystanders. The equipment may be in the form of machines that would endanger inexperienced or inadequately attired personnel, high voltage equipment, or toxic chemicals or compound. The structure that encloses such restricted areas must be sufficiently strong to provide an adequate barrier to prevent unauthorized entry, and yet the enclosure must be reasonably attractive. Furthermore, such structures are subject to damage from vehicles and the like operating inside and outside the protected area, and therefore the panels of the enclosure must be replaceable. In many cases the enclosure surrounds machinery or equipment that requires little attention, and the replaceable panels permit entry into the protected area without requiring a more expensive door panel. Space limitations may also prohibit the installation of a door that swings open. It is therefore desirable that the panels be easily replaced. Once installed, however, the panels must be resistant to tampering from unauthorized personnel, particularly personnel outside the protected area.

To provide for easy replacement of the panels that make up a partition, it has become customary to provide a locking device for locking and unlocking a panel between parallel support members where operation of the lock requires a tool. Where the tool is a readily available such as an Allen wrench, an unauthorized personnel with access to such a tool can easily compromise the barrier and obtain unauthorized access to a restricted area. It is desirable therefore to provide an assembly device with a latch that will latch the parts together but can be easily unlatched to replace a panel. It is also desirable to provide a lock reachable only from within the protected area to prohibit the undesired unlatching of the panel.

SUMMARY OF THE INVENTION

Briefly, the present invention is embodied in a screening for separating an inner protected area from a more accessible area. The screening includes a plurality of equally spaced vertical supports with each support securely fastened to a floor. Between each pair of adjacent vertical supports is a removable panel. Each panel has an inner surface directed toward the protected area and an outer surface directed toward the accessible area, and further has parallel opposing sides. The panel also has an upper attachment member on each of the two sides for attaching to complementary upper attachment members on the vertical supports and has a lower attachment member on each of the sides for attachment to lower attachment members on the vertical supports.

One of the mated pairs of upper and lower attachment members includes a pivot pin such that the panel is pivotable about such pins while the other mated pairs of upper and lower attachment members remain unattached to each other. The other of the mated pairs of attachment members includes a latch for retaining the attachment member of the panel in latched relationship to the attachment member of the vertical support.

In accordance with the invention, the latch can be unlatched for removing and replacing a panel. The latch also includes a lock for selectively locking and unlocking the latch between a locked condition in which the latch cannot be readily unlatched and an unlocked condition in which the latch is readily unlatchable.

BRIEF DESCRIPTION OF THE DRAWINGS

A better understanding of the invention will be had after a reading of the following detailed description taken in conjunction with the drawings wherein.

DETAILED DESCRIPTION OF PREFERRED EMBODIMENT

Figure 1:
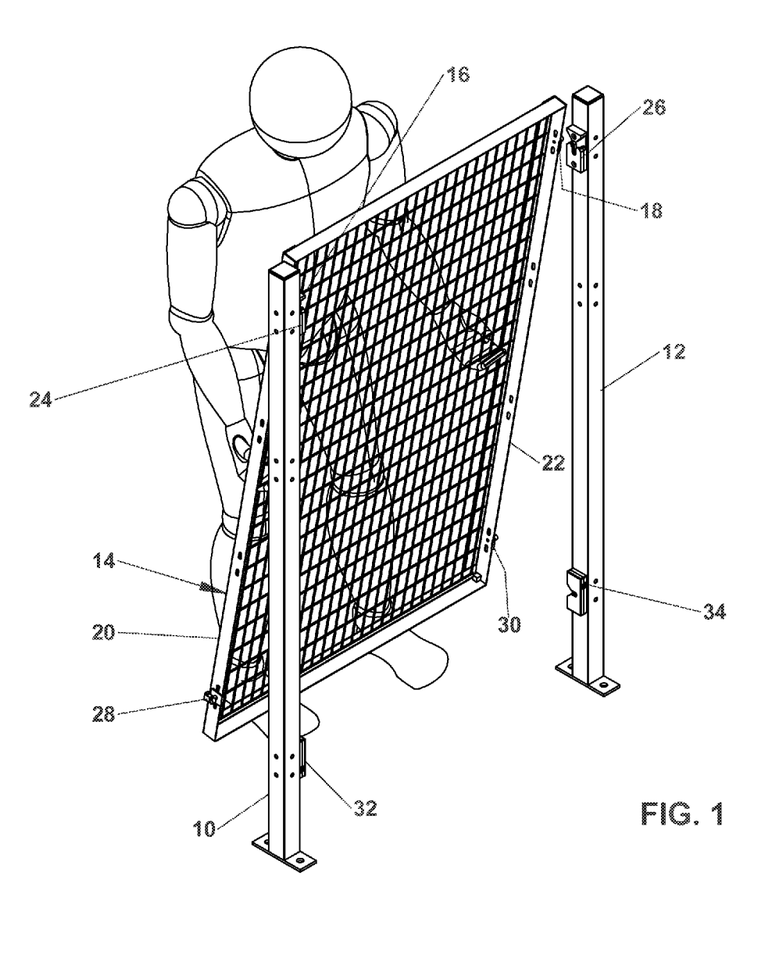
FIG. 1 is an isometric view of a portion of an enclosure showing a panel of the enclosure being assembled between support members.

Referring to FIG. 1, a screening for isolating a protected area from a more accessible area includes a plurality of spaced apart vertical supports, two of which are depicted and bear indicia numbers 10, 12 with the supports 10, 12 positioned to define the outer perimeter of the area to be enclosed. Between each pair of adjacent supports 10, 12 is a panel 14 that is removably retained between the adjacent supports 10, 12 by virtue of a pair of upper attachment members 16, 18 on opposite sides 20, 22 of the panel 14 engaging upper attachment members 24, 26 on each of the vertical supports 10, 12 respectively. Similarly, the panel 14 has lower attachment members 28, 30 on opposite sides 20, 22 thereof that engage associated lower attachment members 32, 34 on the adjacent support member 10, 12 respectively.

Figure 2:
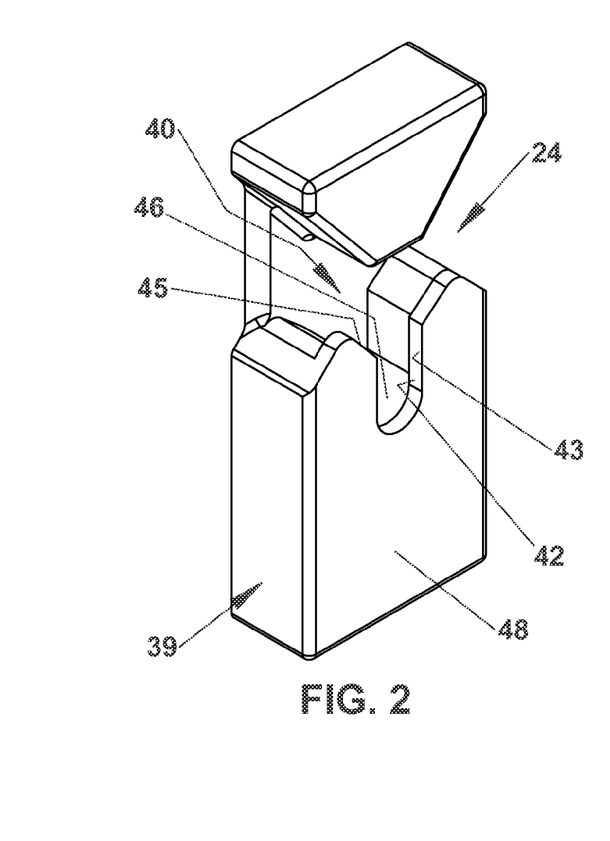
FIG. 2 is an isometric view of one of the upper attachment members on the vertical supports shown in FIG. 1.
Figure 3:
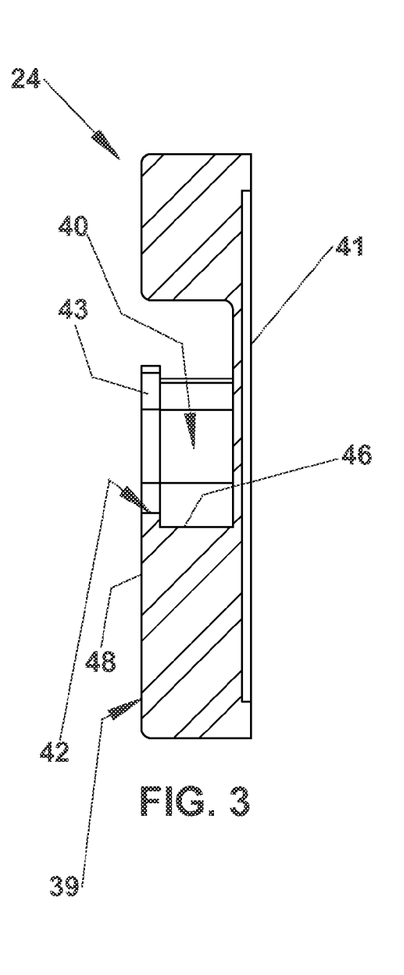
FIG. 3 is a cross-sectional view of the attachment member shown in FIG. 2.
Figure 4:
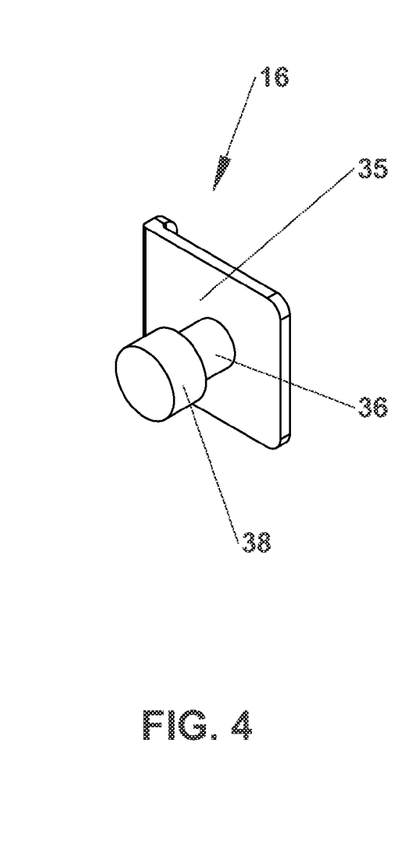
FIG. 4 is an isometric view of one of the upper attachment members on the panel shown in FIG. 1.

As best shown in FIGS. 2, 3, and 4, the upper attachment members 16, 18, of which member 16 is representative of both, are positioned on opposite sides of the panel 14. Each upper attachment member 16 includes a mounting plate 35 from which projects a cylindrical peg 36 from each plate 35, and at the end of each peg 36 is a disc-shaped enlarged head 38. The pegs 36 on opposite sides of the panel 14 are received in a vertically oriented U-shaped groove 40 in each of the upper attachment members 24, 26 of the support members 10, 12.

The upper attachment members 24, 26 are identical to each other and member 24 is therefore representative of both. Each of the attachment members 24, 26 has a generally rectangular body 39 with a rear surface 41 attachable by any suitable means to one of the support members 10, 12. The U-shaped groove 40 has an outer portion 42 having parallel walls 43, 45 that are spaced apart a distance that is greater than the diameter of the peg 36 but less than the diameter of the disc-shaped head 38. Spaced from the outer surface 48 of the attachment member 24 is an inner portion 46 of Groove 40, the parallel sides of which are spaced a distance apart that is greater than the diameter of the enlarged head 38 such that when the peg 36 of the attachment member 24 will slide between the sides of the outer portion 42 of the groove 40 and the enlarged head 38 of the peg 36 is receivable in the inner portion 46 of the groove 40 to thereby retain the upper ends of the panel 14 to the adjacent support members 10, 12. With the panel 14 attached to the upper attachment members 24, 26 and the pegs 36 restrained in the U-shaped groove 40, the lower end of the panel 14 can be pivoted about the pegs 36 until the lower attachment members 28, 30 of the panel 14 engage the lower attachment members 32, 34 of support members 10, 12.

The lower attachment members 28, 30 of panel 14 are received in the lower attachment members 32, 34 on supports 10 and 12, and the mated pair of member 28 on panel 14 and member 32 on support 10 are representative of both mated pairs of attachment members 28-32 and 30-34. Accordingly, the elements of the mated pair of members 28-32 will be described with the understanding that the elements of mated pair 30-34 are identical.

Figure 5:
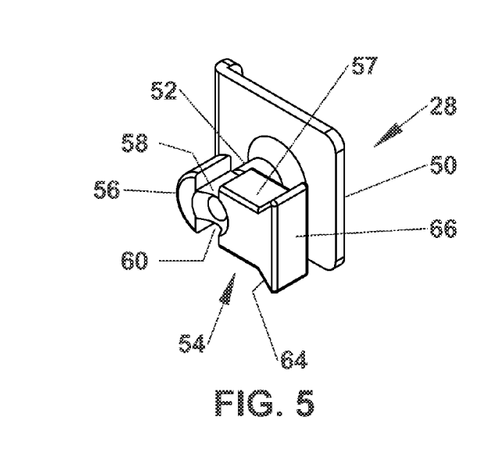
FIG. 5 is an isometric view of a lower attachment member on the panel shown in FIG. 1.
Figure 6:
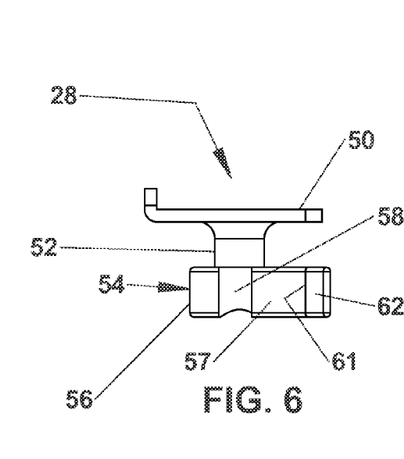
FIG. 6 is a side elevational view of the attachment member shown in FIG. 5.
Figure 7:
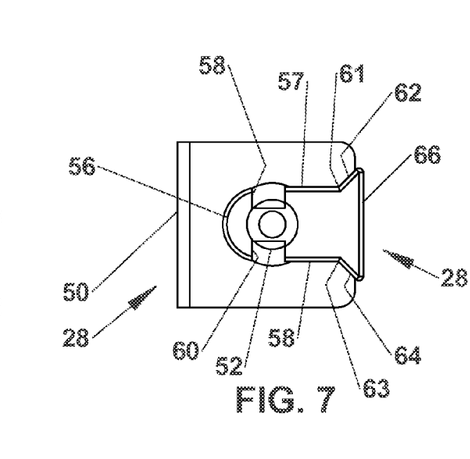
FIG. 7 is a front elevational view of the attachment member shown in FIG. 1.

Referring to FIGS. 5, 6, and 7, the lower panel attachment member 28 includes a planar mounting plate 50 suitable for attachment to one of the sides 20, 22 of the panel 14. The method of attachment of the plate 50 to the side 20, 22 is not part of the invention, however, such attachment should be tamperproof using methods well known in the art such that the attachment member 28 cannot be removed by one outside of the barrier using simple tools such as a screwdriver or a wrench. Extending perpendicular to the surface of the plate 50 is a cylindrical shaft 52, and at the outer end of the shaft 52 is an enlarged head 54. The enlarged head 54 has a semi-cylindrical forward end 56 adapted to be received in an indentation in lower attachment member 32 of the vertical support 10 as is further described below. Rearward of the semi-cylindrical forward end 56 are opposing cutouts 58, 60 adapted to receive a latch pin from the lower attachment member 32 as is also further described below. Rearward of the cutouts 58, 60 are opposing parallel surfaces 57, 59, and rearward of the parallel surfaces 57, 59 are opposing ramped surfaces 62, 64 that flare outward of each other and form sharp intersections 61, 63 with their adjoining surfaces 57, 59 respectively. Rearward of the ramped surfaces is a transverse rear surface 66.

Figure 8:
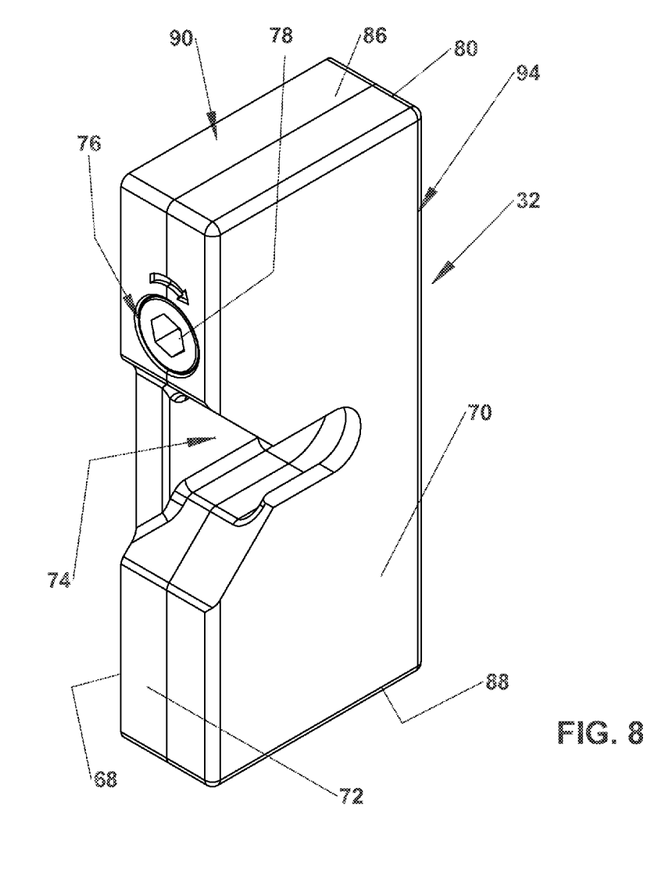
FIG. 8 is an isometric view of a lower attachment member on one of the vertical members shown in FIG. 1.
Figure 8A:
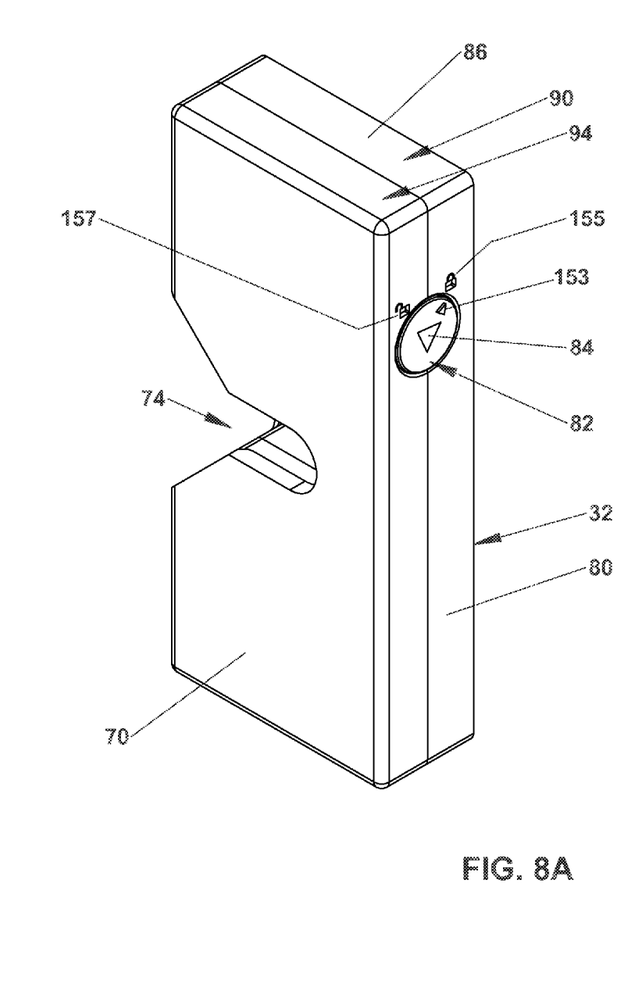
FIG. 8A is a second isometric view of the lower attachment member shown in FIG. 8.

Referring to FIGS. 8 and 8A, lower attachment member 32 has a rectangular body with a mounting side 68 attachable to a surface of one of the support members 10, 12, an exposed side 70 opposite the mounting side 68 and a forward side 72 having an indentation 74 therein for receiving the shaft 52 and enlarged head 54 of the lower attachment member 28, 30 of a panel 14. Extending into the forward side 72 and adjacent the indentation 74 is a rotatable forward actuator 76 having an aperture 78 therein shaped to receive a tool, such as a hex Allen wrench as depicted in FIG. 8. Opposite the forward side 72 is a generally planar rearward side 80, and extending through the rearward side 80 is a second rotatable rearward actuator 82. The rearward actuator 82 has a centrally located aperture 84 therein shaped to receive a second tool, which may be the same as the tool insertable in aperture 78, or may be different from the tool insertable in aperture 78 for operating the forward actuator 76. In the embodiment depicted, aperture 84 of actuator 82 is adapted to receive an elongate tool with a triangular cross-section. According, in this embodiment the Allen wrench used to operate the forward actuator 76 cannot be used to operate the rearward actuator 82.

The lower attachment member 32 also has generally planar ends 86, 88 each of which is equally spaced from the indentation 74. Since the ends 86, 88 are equal distant from indentation 74 member 32 can be attached to support 10 with end 88 extending upward, or it may be attached to support 12 with end 86 extending upward. Accordingly, attachment members 32, 34 are identical to each other as opposed to being mirror images of one another. The mounting side 68 of the member 32 is attachable to one of the supports 10, 12 using tamperproof methods known in the art such that attachment member 32 cannot be disconnected from its associated support using ordinary tools such as screw drivers and wrenches.

Figure 9:
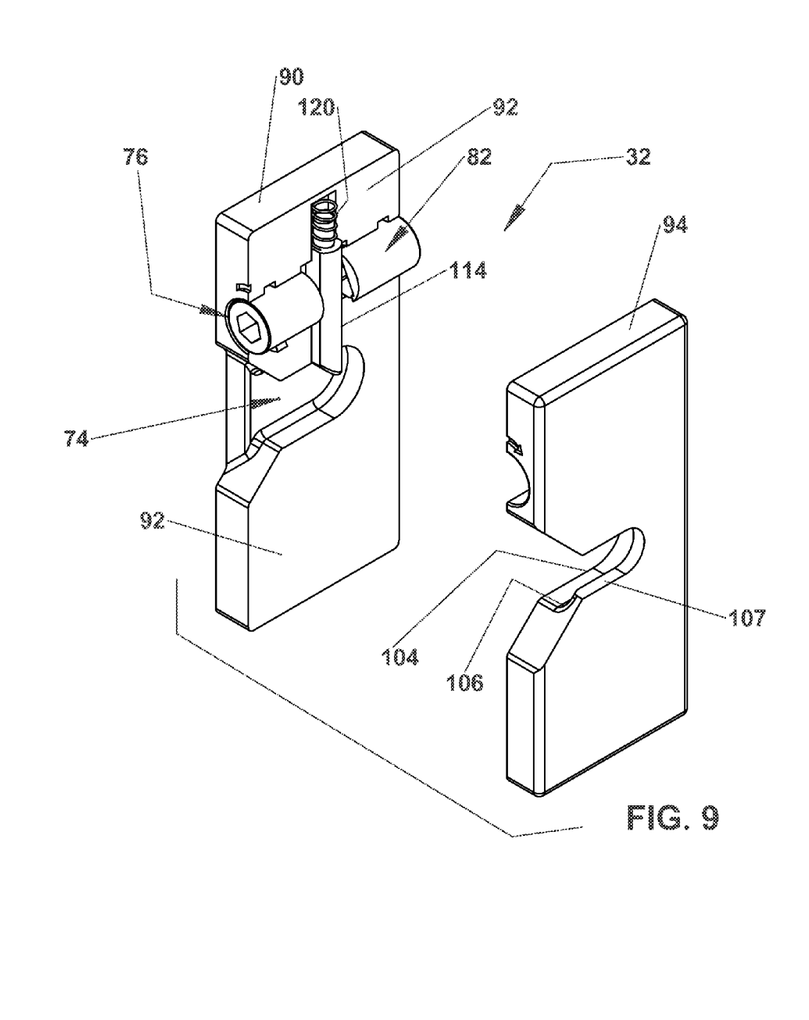
FIG. 9 is a partially exploded view of the attachment member shown in FIGS. 8 and 8A.
Figure 10:
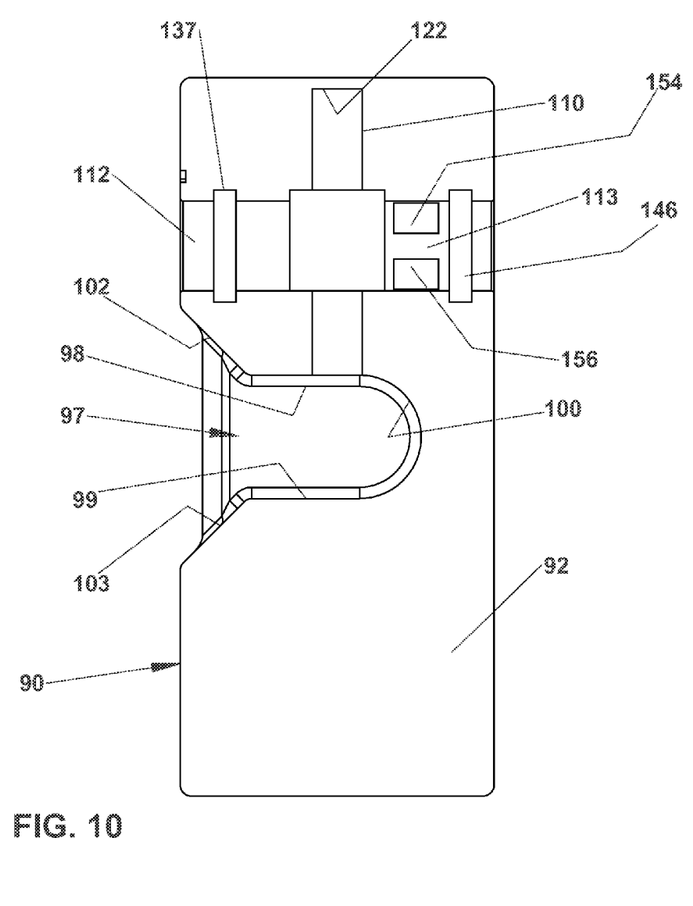
FIG. 10 is a front elevational view of the inner surface of one of the panels that form the housing of the attachment members shown in FIGS. 8 and 8A.
Figure 11:
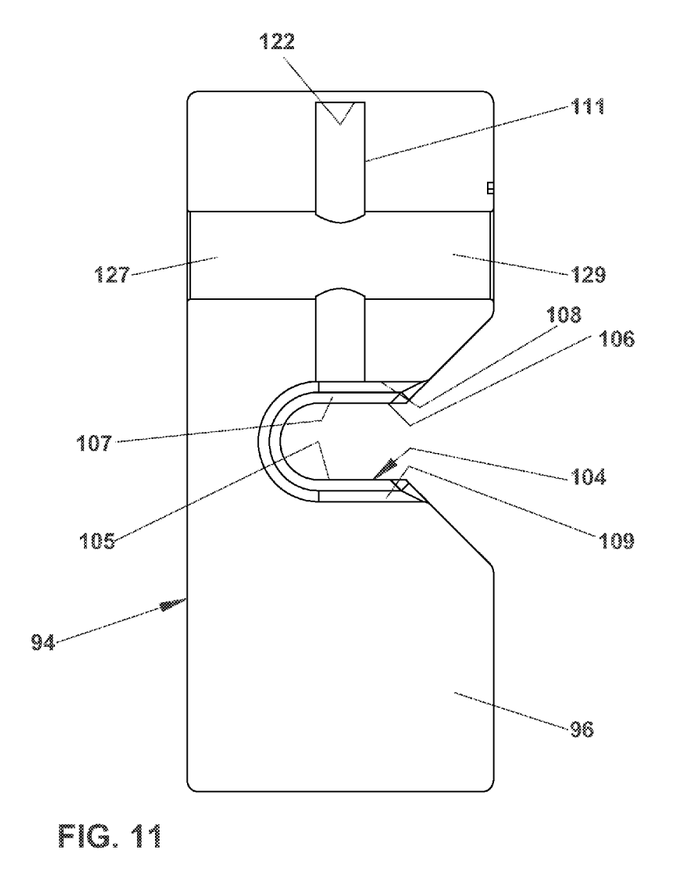
FIG. 11 is a front elevational view of the inner surface of the second panel that mates against the panel shown in FIG. 10 to form the housing of the attachment member shown in FIGS. 8 and 8A.
Figure 12:
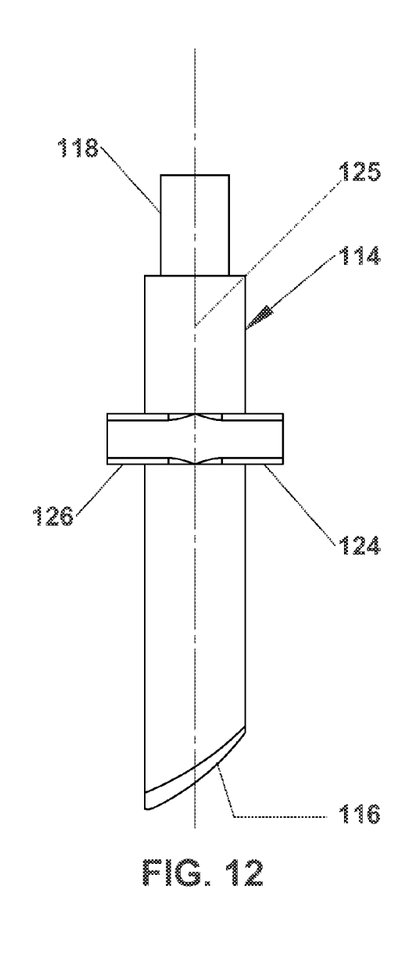
FIG. 12 is a side elevational view of the latch pin for the attachment member shown in FIGS. 8 and 8A.

Referring to FIGS. 9, 10, and 11, the lower attachment member 32 has an inner cavity for receiving removable parts therein. To create the cavity, attachment member 32 has a mounting panel 90, the rearward surface of which is the mounting side 68 of the member 32 and the forward surface 92 has cutouts therein as further described below. Positioned above the mounting panel 90 is a outer panel 94, the outer surface of which is the exposed surface 70 of the member 32 and the inner surface 96 of which has cutout portions as described below which complement the cutouts in the forward surface 92 of the mounting panel 90. Accordingly, when the outer panel 94 is assembled over the mounting panel 90, the cutouts in surface 92 mate with the cutouts in surface 96 to form the cavity within the attachment member 32.

As shown in FIG. 10, the mounting panel 90 has a centrally located cutout 97 in surface 92 which does not penetrate to the mounting side 68. Cutout 97 has opposing sides 98, 99 that are generally perpendicular to surface 70 and to forward side 72 of member 32, and sides 98, 99 extend across the center of panel 90 with the ends thereof intersecting and forming a semi-cylindrical outer wall 100 that is spaced a short distance from rearward side 80. Opposite outer wall 100, sides 98, 99 define diverging surfaces 102, 103 which connect to forward side 72 and thereby form a mouth for the indentation 74. Sides 98, 99 are spaced apart a distance that is greater than the width of the enlarged head 54 of the attachment member 28 on the panel 14 for receiving enlarged head 54 therebetween. The diverging surfaces 102, 103 are shaped complementary to the ramped surfaces 62, 64 of attachment member 28.

As shown in FIG. 11, the outer panel 94 has a cutout 104 that is complementarily shaped to cutout 97; however, cutout 104 has portions thereof that penetrate through the body of outer panel 94 from inner surface 96 to exposed surface 70. The portion of cutouts 104 that penetrate surface 70 forms a slot in surface 70 with parallel sides 105, 106 spaced apart a distance that is smaller than the width of the enlarged head 54 of member 28, but larger than the cylindrical shaft 52 to which the head 54 is attached. A shoulder 107 surrounds slot 105, 106 and the portion of cutout 104 that does not penetrate surface 70 is enlarged by shoulder 107 to inner walls 108, 109 positioned complementarily to sides 98, 99 and diverging surfaces 102, 103 of cutout 97 in panel 90. Accordingly, when the outer panel 94 is mated to the mounting panel 90, the cutouts 97 and 104 will mate and form the indentation 74 which will receive the enlarged head 54 of an attachment member 28 and the shaft 52 will be received in the slot 105, 106 defined by the shoulder 107. Also, when the enlarged head 54 of attachment member 28 is received in the indentation 74 with semi-cylindrical forward end 56 abutting the semi-cylindrical outer wall 100 of attachment member 32, the ramped surfaces 62, 64 of attachment member 28 will abut against the complementary shaped diverging surfaces 102, 103 of attachment member 32. The complementary surfaces 62, 102 and 64, 103 will obstruct access to the latch pin by a tool, not shown, because the tool will be unable to negotiate around either of the sharp intersections 61, 63 to reach a latch pin 114 as is described below, to compromise the latch.

Referring further to FIGS. 10 and 11, attachment member 32 also includes a vertically extending groove 110 in surface 92 of mounting panel 90 and a complementary vertical groove 111 in the inner surface 96 of outer panel 94 that extends parallel to the forward and rearward sides 72, 80 and intersect the indentation 74 for receiving the slideable latch pin 114.

Figure 20:
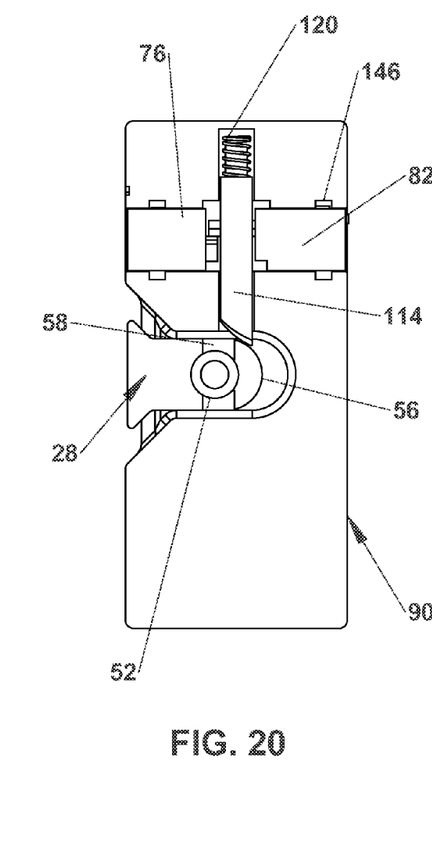
FIG. 20 is a front elevational view of the panel shown in FIG. 10 with the parts assembled as shown in FIG. 19 and the enlarged head of a lower attachment member shown in FIG. 5 urging the latch pin out of the retention indentation.
Figure 21:
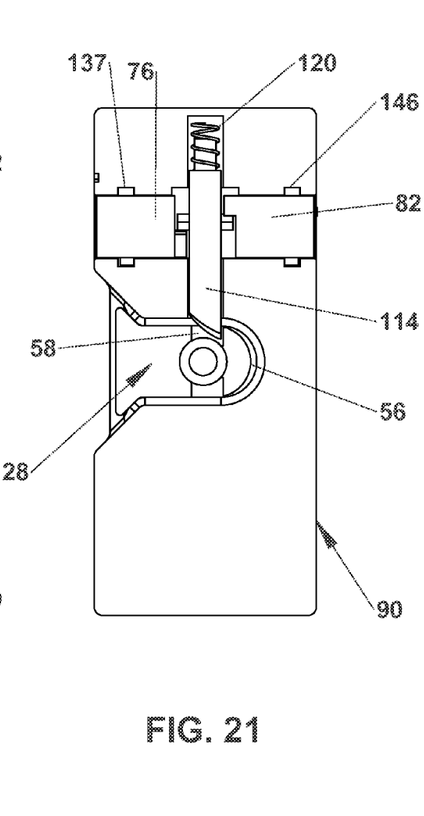
FIG. 21 is another front elevational view of the parts shown in FIG. 20 with the latch pin in the latching position.

Referring to FIGS. 9, 12, 13, 18, 20, and 21, the slideable latch pin 114 has an elongate body with an angled engagement end 116 that extends into the indentation 74, and opposite the engagement end 116 is a small diameter mounting peg 118 around which is fitted one end of a coil spring 120. The opposite end of the coil spring 120 abuts a blind wall 122 in panels 90 and 94 that extends across one end 86 of the member 32. The spring 120 therefore urges the angled engagement end 116 of the latch pin into the indentation 74. The latch pin 114 is longitudinally moveable within the cavity formed by mated grooves 110, 111 from a first position with the coil spring 120 compressed and the engagement end 116 withdrawn from indentation 74 (as shown in FIG. 20) to a second position with the coil spring 120 extended and the engagement end extending into indentation 74 for latching to connector 28 (as shown in FIG. 21). The angled engagement end 116 is directed toward the forward surface 72 of attachment member 32 such that the entry of enlarged head 54 into the indentation 74 will cause the enlarged head 54 to contact the angled surface 116 and urge the latch pin 114 against coil spring 120.

Figure 13:
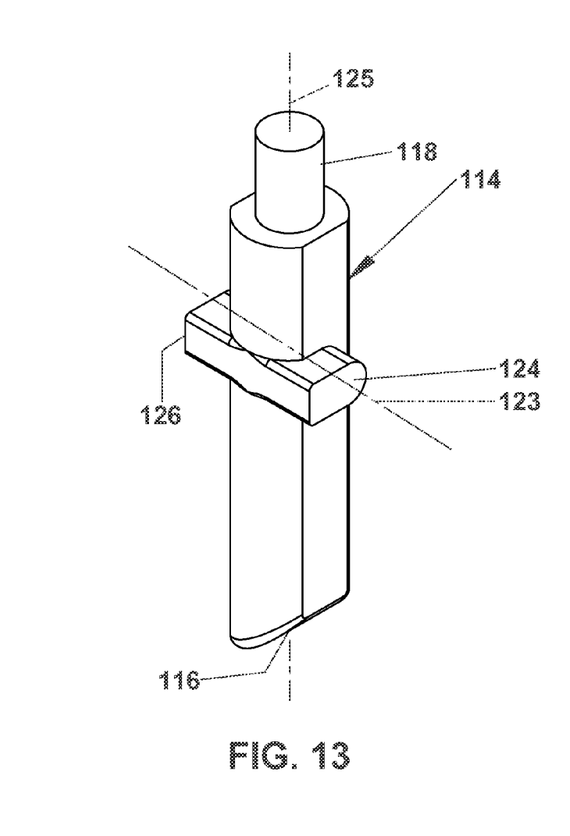
FIG. 13 is an isometric view of the latch pin shown in FIG. 12.
Figure 14:
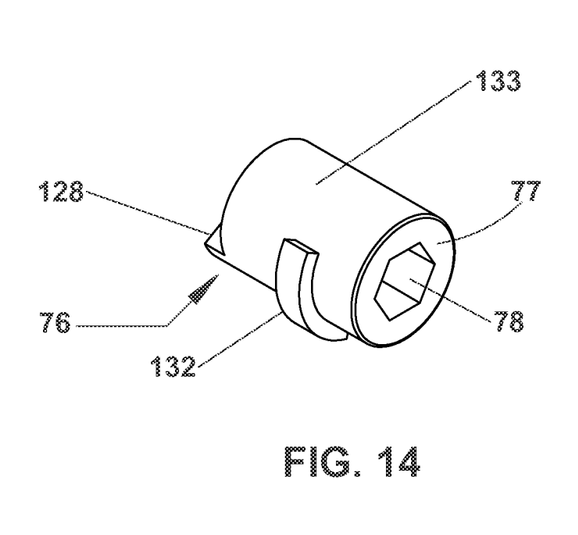
FIG. 14 is an isometric view of the forward actuator for the attachment member shown in FIGS. 8 and 8A.
Figure 15:
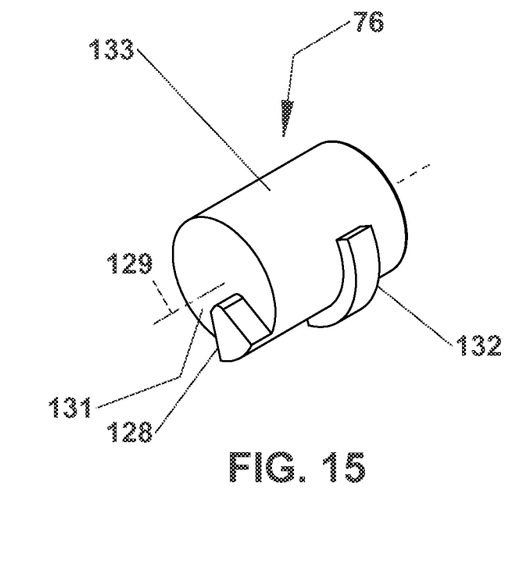
FIG. 15 is a second isometric view of the forward actuator shown in FIG. 14.
Figure 16:
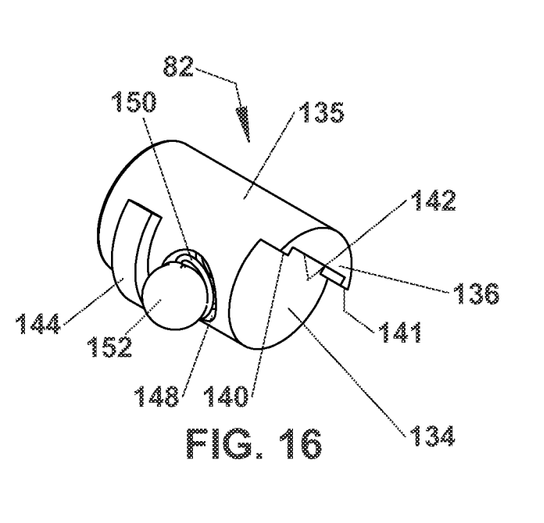
FIG. 16 is an isometric view of the rearward actuator for the attachment member shown in FIGS. 8 and 8A.
Figure 17:
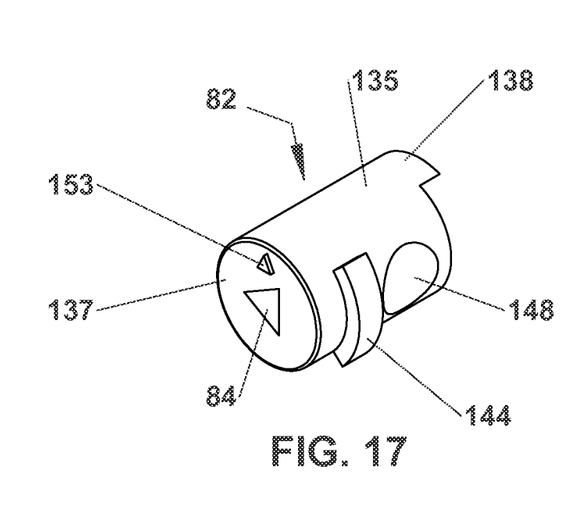
FIG. 17 is a second isometric view of the actuator shown in FIG. 16.
Figure 18:
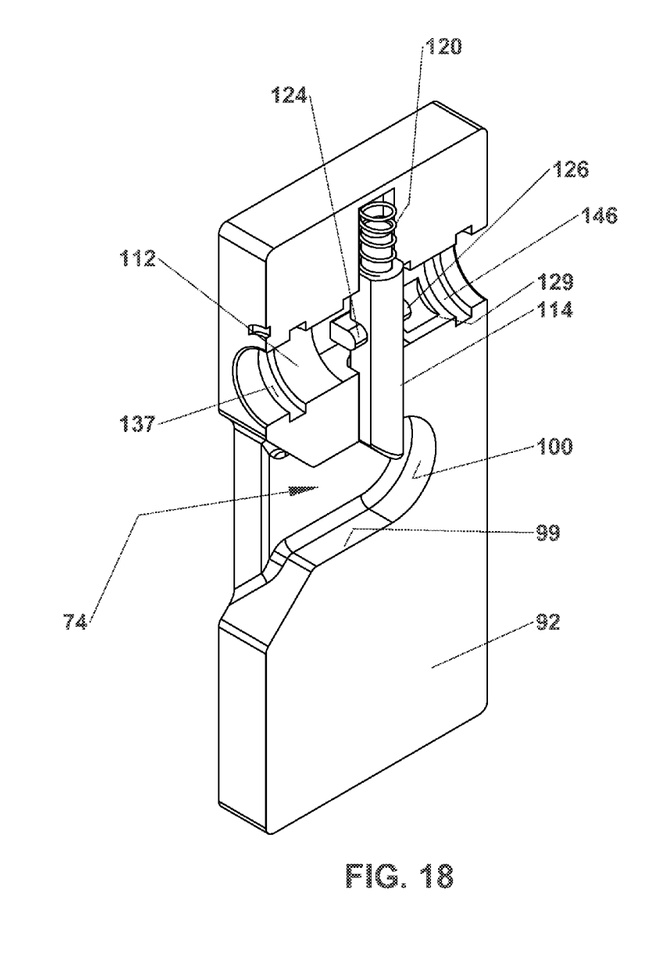
FIG. 18 is an isometric view of the panel shown in FIG. 10 with the latch pin installed therein.
Figure 19:
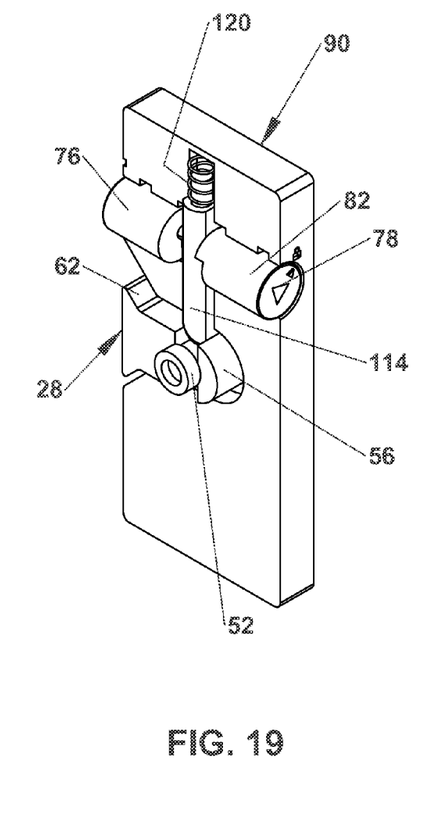
FIG. 19 is another isometric view of the panel shown in FIG. 10 with the latch pin and both actuators installed therein.

Extending from opposite sides of the central shaft of the latch pin 114 are first and second cam followers 124, 126. As best shown in FIG. 13, cam followers 124, 126 are axially aligned with each other along a central axis 123 that is perpendicular to the axis 125 of the latch pin 114, but is spaced from axis 125 and does not intersect axis 125.

Referring to FIGS. 9, 10, 11, and 14-17, the forward surface 92 of the mounting panel 90 also has aligned opposing cutouts 112 and 113 on opposite sides of latch groove 110. The inner surface 96 of the outer panel 94 similarly has complementary cutouts 127, 129 on opposite sides of latch groove 111. The mated cutouts 112, 129 rotatably receive a first cylindrically shaped forward actuator 76 and mated cutouts 113, 127 rotatably receive a second cylindrically shaped rearward actuator 82.

Referring to FIGS. 10 through 15, the forward actuator 76 has an exposed surface 77 adapted to be coplanar with side 72 of attachment member 32, a parallel opposite wall 131, a cylindrical outer wall 133 and a longitudinal axis 129. Aperture 78 extends into exposed surface 77 and is adapted to receive an operating tool, not shown, for rotating forward activator 76. Extending outward of wall 131 is a cam 128 that extends parallel to the longitudinal axis 129. Extending around a portion of the circumference of the cylindrical wall 133 of forward actuator 76 is an arcuate flange 132 that is adapted to fit within an arcuate groove 137 around cutout 112 in the forward surface 92 of mounting panel 90 for retaining the forward actuator 76 within the body of the attachment member 32. It should be noted that surface 96 of panel 94 does not have an arcuate groove complementary to groove 137. In the preferred embodiment, the arcuate flange 132 defines an arc of one hundred and five degrees. Accordingly, when the forward actuator 76 is received in the aperture formed by complementary grooves 112, 129 with the arcuate flange 132 fitted into groove 137, the forward actuator 76 is rotatable through an arc of seventy-five degrees. The cam 128 of actuator 76 is positioned with respect to the arcuate flange 132 such that the cam 128 will engage cam follower 124 of the latch pin 114 as the actuator 76 is rotated. Rotation of the forward actuator 76 in one direction will urge the follower 124 and latch pin 114 against the spring 120 and draw the angled end 116 thereof out of the indentation 74 to thereby release an enlarged head 54 of an attachment member 28 entrapped in the indentation 74 and unlatching the latch.

Referring to FIGS. 9, 10, 11, 12, 13, 16, 17, 20, and 21, rearward actuator 82 also has a cylindrically shaped body 135 with a rearwardly facing surface 137 having aperture 84 therein for receiving a tool, not shown, for rotating the actuator, where the tool received in aperture 84 is different from the tool received in aperture 78 of the forward actuator 76. The actuator 82 further has an opposing surface 134, and extending axially outward of the opposing surface 134 is a projection 136. The projection 136 is defined by an arcuate outer wall 138 that is a projection of a portion of the cylindrical body 135 of the actuator 82, and a generally planar inner wall 142 that defines a cord across the surface 134 and connects to opposite ends of the arcuate wall 138. The inner wall 142 further has shoulders 140, 141 at the ends thereof for trapping cam follower 126 as is further described below. The rearward actuator 82 also has an arcuate flange 144 extending around a portion of the cylindrical body 135 thereof which is adapted to fit within an arcuate groove 146 in the forward surface 92 of mounting panel 90 for retaining the rearward actuator 82 within the aperture formed by the mated cutouts 113, 127. Surface 96 of panel 94 does not have a groove complementary to groove 146 in surface 92. In the preferred embodiment, the arcuate flange 144 defines an arc of ninety degrees such that the rearward actuator 82 is rotatable within the aperture formed by cutouts 113, 127 through ninety degrees. The arcuate flange 144 is oriented with respect to the projection 136 such that when the flange 144 is received in the groove 146, rotation of the rearward actuator 82 through ninety degrees will cause the projection 136 to rotate from a first position, as shown in FIG. 20, where it is adjacent to cam follower 126 and will not interfere with cam follower 126 to a second position, best shown in FIG. 21, in which wall 142 of the projection 136 obstructs the movement of cam follower 126 and thereby prevents the retraction of the latch pin 114 against the spring 120 locking the latch pin 114 in a latching position. Accordingly, rotation of the rearward actuator in one direction locks the latch pin 114 in the latching condition and rotation of the rearward actuator 82 in the opposite direction releases the lock and allows the latch pin 114 to be retracted upon actuation of the forward actuator 76. Shoulders 140, 141 on opposite sides of wall 142 are adapted to contact cam follower 126 and prevent the cam follower 126 from rotating the rearward actuator 82 and thereby moving wall 142 out of its obstructing position.

The rearward actuator further includes a cylindrical blind hole 148 extending radially into the cylindrical body 135 perpendicular to the longitudinal axis thereof into which is received a coil spring 150 and a ball bearing 152. The coil spring 150 will accordingly urge the ball bearing 152 against the surface of the cutout 113. In the preferred embodiment, the cutout 113 in surface 92 includes a pair of spaced apart flats 154, 156 positioned to be engaged by ball bearing 152 at opposite ends of the rotation of the rearward actuator 82. Accordingly, the completion of a full rotation of rearward actuator 82 in one direction will result in a click as ball bearing 150 engages one flat 154 indicating the end of the such rotation, and completion of rotation of the actuator 82 in the opposite direction will result in a second click as ball bearing contacts flat 156.

Referring to FIG. 8A, the rearward actuator 82 has a marking 153 on the outer surface thereof and the rearward surface 80 of attachment member 32 also has markings 155 and 157 thereon near the rearward actuator 82. The marking 153 is positioned to align with marking 155 when the rearward actuator is in the locked condition and align with marking 157 when the rearward actuator 82 is in the unlocked condition.

The outer panel 94 is secured against the forward surface 92 of the mounting panel 90 by any suitable means known in the art, such as connectors or an adhesive to retain the parts permanently assembled such that the lower attachment members 32, 34 cannot be readily compromised by separating the panels 90, 94.

Laws that regulate the barriers defining restricted areas require that the enclosure cannot be compromised by a person standing outside of the enclosure using commonly available tools such as screw drivers, wrenches, or Allen wrenches. The legal requirements may be met by providing a locking device accessible from outside the enclosure where the locking device is only operable using a specially made tool, such as the triangularly shaped tool required to operate the rearward actuator 82 as depicted in the drawings. Many prior art panels are removable from outside of the barrier using such specially made tools. Alternately, the laws permit the removal of a panel of a barrier by a person positioned inside the barrier using commonly available tools, and accordingly, a rearward actuator 82 that receives an Allen wrench would meet this requirement. The inner and outer actuators 76, 82 provided on the attachment members 32, 34 enable a user to chose either of these embodiments for locking a panel 14 between supports 10, 12. Alternately, a user can employ the structure depicted in which the outer actuator 76 is operable using a standard tool such as an Allen wrench and the inner actuator 82 is only operable using a specially designed tool. The locking device of the present invention therefore offers several levels of security to potential users. At the least secure level both actuators 76, 82 may be operable by the same tool, which may be a commonly available tool such as an Allen wrench. At a more secure level the actuators 76, 82 may require different tools, and at a most secure level, one of the tools may not be a commonly available tool.

Referring to FIG. 1, when the panel 14 is assembled between support members 10, 12 and the cylindrical pegs 36 and disc-shaped heads 38 of the upper attachment members are received in the vertically oriented grooves 40 of the upper attachment members 24, 26, the lower end of the panel 14 can swing freely about the cylindrical pegs 36. The panel 14 can therefore be rotated about the pegs 36 until the shaft 52 and enlarged head 54 of the lower attachment members 32, 34 are engaged in the indentations 74 of the lower attachment members 32, 34. As the enlarged head 54 of members 28, 30 move into the indentation 74 of the lower attachment members 32, 34, the enlarged head 54 will contact the angled end 116 of the latch pin 114 and the enlarged head 54 will urge the latch pin 114 against the spring 120. Further movement of the large head 54 into the indentation 74 results in the angled end 116 of the latch pin dropping into one of the cutouts 58, 60 behind the enlarged head 54 thereby latching the lower end of the panel 14 between support members 10 and 12.

Once panel 14 has been latched between support panels 10 and 12, a suitable key for operating the rearward actuator 82 can be inserted into aperture 84 and turned through ninety degrees to lock the lower attachment members 28, of panel 14 into the attachment members 32, 34 of the supports 10, 12. Thereafter, an Allen wrench or other readily available tool cannot be used to rotate the forward actuators 76 to unlock the panel 14. Furthermore, an unauthorized member positioned outside of the protected area who has access to the appropriate tool receivable in the rearward actuator 82 cannot use the tool to remove a panel 14 because the rearward actuator 82 is only accessible from within the protected area. Accordingly, mere possession of the appropriate tool to operate rearward actuator 82 will not enable one to obtain access to the protected area. Where it becomes necessary to replace one of the panels 14, an authorized person within the protected area can use the appropriate tool receivable in aperture 84 to rotate the rearward actuator 82 and unlock the lower attachment units 32, 34. Thereafter, a more readily available tool, such as an Allen wrench, receivable in apertures 78, can be used to unlatch each of the lower attachment members 32, 34 and remove and replace a damaged panel 14.

In the embodiment described above, the upper attachment members 16, 18 and 24, 26 have been described as including pegs 36 on the panel 14 and grooves 40 on support members 10, 12; however, it should be appreciated that the pegs 36 could be positioned on the support members 10, 12 and the grooves 40 on the panel 14 without departing the invention. Similarly, lower attachment members 28, 30 of panel 14 could be reversed with the lower attachment members 32, 34 of support members 10, 12. That is, latching members 32, 34 could be placed on panel 14 with the shaft 52 and enlarged head 54 placed on support members 10, 12 without departing from the invention. Finally, the mated pairs of upper attachment members 16, 18 and 24, 26 can be reversed with the mated pairs of lower attachment members 28, 30 and 32, 34 so that the upper end of panel 14 pivots on pegs 36 at the lower end of the panel 14 and the latches 32, 34 are positioned above the pegs 36.

As can be seen, the present invention permits ready replacement of panels 14 by authorized personnel but prevents an unauthorized person that is outside the protected area from compromising the lock of the invention, even if the unauthorized person possesses the appropriate tool to unlock the rearward actuator 82.

While the present invention has been described with respect to a single embodiment, it will be appreciated that many modifications and variations may be made without departing from the spirit and scope of the invention. It is therefore the intent of the appended claims to cover all such modifications and variations that fall within the spirit and scope of the invention.

What is claimed:

1. A screening for separating an inner protected area from a more accessible area comprising:
   first and second spaced apart vertical supports,
   each of said vertical supports having an upper and a lower support attachment member; and
   a panel having an inner surface, an outer surface, and first and second parallel sides,
   wherein the first side of said panel comprises an upper panel attachment member for attachment to said upper support attachment member of said first vertical support to form a first mated pair of upper attachment members,
   wherein the second side of said panel comprises an upper panel attachment member for attachment to said upper support attachment member of said second vertical support to form a second mated pair of upper attachment members,
   wherein the first side of said panel further comprises a lower panel attachment member for attachment to said lower support attachment member of said first vertical support to form a first mated pair of lower attachment members,
   wherein the second side of said panel comprises a lower panel attachment member for attachment to said lower support attachment member of said second vertical support to form a second mated pair of lower attachment members,
   said first mated pair of upper attachment members and said second mated pair of upper attachment members including at least one pivot pin wherein said panel is pivotable about said at least one of said mated pairs of upper attachment members while said first mated pair of lower attachment members and said second mated pair of lower attachment members remain unattached to each other,
   at least one of said first mated pair of lower attachment members and said second mated pair of lower attachment members including a latch wherein the at least one mated pair of lower attachment members are latchable together to retain said panel to said vertical supports,
   said latch including a cam for unlatching said latch wherein said cam is operable from said outer surface of said panel, and
   said latch further including a lock for selectively locking and unlocking said latch between a locked condition wherein said cam is rendered inoperable, and an unlocked condition wherein said cam is operable,
   said latch further including a latch pin and a mating attachment member comprising at least one cutout adapted to receive at least a portion of the latch pin when the at least one mated pair of lower attachment members is latched together,
   said latch pin adapted to prohibit movement of said mating attachment member when the at least a portion of the latch pin is received by the at least one cutout and when said lock is in a locked condition.

2. The screening of claim 1 wherein said lock is only operable from said inner surface of said panel.

3. A screening of claim 1 wherein said lock is operable by a tool and said tool is useable only from said inner surface of said panel.

4. The screening of claim 1 wherein said cam is operable by a first tool and said lock is operable by a second tool that is different from said first tool.

5. The screening of claim 1 and further comprising said at least one of said first mated pair of lower attachment members and said second mated pair of lower attachment members including an indentation for receiving the mating attachment member, said indentation having diverging surfaces to form a mouth thereof, said mating attachment member having a body with parallel sides and adjacent said parallel sides, ramped surfaces wherein said ramped surfaces mate with said diverging surfaces to obstruct access to a tampering tool to said latch.

6. The screening of claim 1 wherein said cam is operable from said outer surface and said lock is operable only from said inner surface of said panel.

7. The screening of claim 6 wherein said cam is operable by a first tool and said lock is operable by a second tool that is different from said first tool.

8. A screening for separating an inner protected area from a more accessible area comprising
   first and second spaced apart vertical supports, said first vertical support comprising a first upper support connector and a first lower support connector, said second vertical support comprising a second upper support connector and a second lower support connector;
   a panel having an inner surface, an outer surface, and first and second parallel sides, said first parallel side comprising a first upper panel connector and a first lower panel connector, said second parallel side comprising a second upper panel connector and a second lower panel connector,
   said panel between said first and second spaced apart vertical supports and attached thereto by 1) mating the first upper support connector and the first upper panel connector to provide a first mated pair of upper connectors, and 2) mating the second upper support connector and the second upper panel connector to provide a second mated pair of upper connectors,
   said panel also attached between said first and second supports by 1) mating said first lower support connector and said first lower panel connector to provide a first mated pair of lower connectors and 2) mating said second lower support connector and said second lower panel connector to provide a second mated pair of lower connectors,
   at least one of said first mated pair of upper connectors and said second mated pair of upper connectors including a pivot pin wherein said panel is pivotable about said pivot pin while said first mated pair of lower connectors and said second mated pair of lower connectors are unconnected,
   at least one of said first mated pair of lower connectors and said second mated pair of lower connectors including a releasable latch for releasably retaining said panel to one of said first and second vertical supports, and
   said latch including a lock for selectively locking and unlocking said latch, wherein said latch is unreleasable while in said locked condition and releasable in said unlocked condition,
   said latch further including a latch pin and a mating attachment member comprising at least one cutout adapted to receive at least a portion of the latch pin when at least one of the first mated pair of lower connectors and second mated pair of lower connectors is latched together, said latch pin adapted to prohibit movement of said mating attachment member when the at least a portion of the latch pin is received by the at least one cutout and when said lock is in a locked condition.

9. The screening of claim 8 and further comprising at least one of said first mated pair of lower connectors and said second mated pair of lower connectors including an indentation for receiving the mating connector, said indentation having diverging surfaces to form a mouth thereof, said mating attachment member having a body with parallel sides and adjacent said parallel sides, ramped surfaces wherein said ramped surfaces mate with said diverging surfaces to obstruct access to a tampering tool to said releasable latch.

10. The screening of claim 8 wherein said lock is only operable from said inner surface of said panel.

11. The screening of claim 8 wherein said lock is operable by a tool and said tool is useable only from said inner surface of said panel.

12. The screening of claim 8 wherein said releasable latch is operable by a first tool and said lock is operable by a second tool that is different from said first tool.

13. The screening of claim 8 wherein said releasable latch is operable from said outer surface and said lock is operable only from said inner surface of said panel.

14. The screening of claim 13 wherein said releasable latch is operable by a first tool and said lock is operable by a second tool that is different from said first tool.

15. A screening for separating an inner protected area from a more accessible area comprising first and second spaced apart vertical supports, said first vertical support comprising a first upper support connector and a first lower support connector, said second vertical support comprising a second upper support connector and a second lower support connector, a panel having an inner surface, an outer surface, and first and second parallel sides, said first parallel side comprising a first upper panel connector and a first lower panel connector, said second parallel side comprising a second upper panel connector and a second lower panel connector, said panel between said first and second supports and attached thereto by 1) mating said first upper support connector and said first upper panel connector to provide a first mated pair of upper connectors, and 2) mating said second upper support connector and said second upper panel connector to provide a second mated pair of upper connectors, said panel also attached between said first and second supports by 1) mating said first lower support connector and said first lower panel connector to provide a first mated pair of lower connectors, and 2) mating said second lower support connector and said second lower panel connector to provide a second mated pair of lower connectors, the first mated pair of upper connectors and the second mated pair of upper connectors including pivot pins wherein said panel is pivotable about said pivot pins while 1) the first lower support connector and the first lower panel connector is unconnected and 2) the second lower support connector and the second lower panel connector is unconnected, at least one of said first mated pair of lower connectors and said second mated pair of lower connectors including a releasable latch for releasably retaining said panel to at least one of said first and second vertical supports, said latch including an indentation for receiving a mating attachment member, wherein said latch is unreleasable while in said locked condition and releasable in said unlocked condition, said indentation having diverging surfaces to form a mouth thereof, and said mating attachment member having a body with parallel sides and adjacent said parallel sides, ramped surfaces wherein said ramped surfaces mate with said diverging surfaces to obstruct access to a tampering tool to said releasable latch, said latch including a lock for selectively locking and unlocking said latch, wherein said latch is unreleasable while in said locked condition and releasable in said unlocked condition, said latch further including a latch pin, said mating attachment member having at least one cutout adapted to receive at least a portion of the latch pin when at least one of the first mated pair of lower connectors and second mated pair of lower connectors is latched together, said latch pin adapted to prohibit movement of said mating attachment member when the at least a portion of the latch pin is received by the at least one cutout and when said lock is in a locked condition.

16. The screening of claim 15 wherein said lock is only operable from said inner surface of said panel.

17. The screening of claim 15 wherein said lock is operable by a tool and said tool is useable only from said inner surface of said panel.

18. The screening of claim 15 wherein said releasable latch is operable by a first tool and said lock is operable by a second tool that is different from said first tool.

19. The screening of claim 15 wherein said releasable latch is operable from said outer surface and said lock is operable only from said inner surface of said panel.

* * * * *